US007957342B2

(12) United States Patent
Ohmi et al.

(10) Patent No.: US 7,957,342 B2
(45) Date of Patent: Jun. 7, 2011

(54) MASTER STATION OF COMMUNICATION SYSTEM AND ACCESS CONTROL METHOD

(75) Inventors: Shinichiro Ohmi, Toyono-gun (JP);
Kensuke Yoshizawa, Osaka (JP);
Tsuyoshi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 11/987,762

(22) Filed: Dec. 4, 2007

(65) Prior Publication Data

US 2008/0117882 A1 May 22, 2008

Related U.S. Application Data

(62) Division of application No. 10/912,192, filed on Aug. 6, 2004, now Pat. No. 7,315,524.

(30) Foreign Application Priority Data

Aug. 6, 2003 (JP) .................................. 2003-288090

(51) Int. Cl.
*H04J 3/06* (2006.01)
(52) U.S. Cl. ........ 370/328; 370/350; 370/503; 455/502; 455/507
(58) Field of Classification Search .................... 455/507
See application file for complete search history.

(56) References Cited

U.S. PATENT DOCUMENTS

| 5,754,799 A | 5/1998 | Hiles ............................. 370/110 |
| 6,788,656 B1 | 9/2004 | Smolentzov et al. ......... 370/328 |
| 7,315,524 B2* | 1/2008 | Ohmi et al. .................... 370/322 |
| 7,346,021 B2* | 3/2008 | Yoshizawa et al. ........... 370/322 |
| 2002/0093929 A1 | 7/2002 | Mangold et al. ............... 370/336 |
| 2003/0128684 A1 | 7/2003 | Hirsch et al. .................. 370/338 |
| 2003/0169697 A1 | 9/2003 | Suzuki et al. ................. 370/310 |
| 2005/0074036 A1* | 4/2005 | Gorday et al. ................ 370/513 |
| 2005/0169292 A1* | 8/2005 | Young .......................... 370/432 |
| 2005/0177639 A1* | 8/2005 | Reunamaki et al. .......... 709/227 |

FOREIGN PATENT DOCUMENTS

| BA | 2003-0043954 | 6/2003 |
| JP | 2001-53745 | 2/2001 |
| JP | 2002-198834 | 7/2002 |
| JP | 2003-37556 | 2/2003 |
| JP | 2003-143644 | 5/2003 |
| WO | 02/13442 | 2/2002 |
| WO | 03/047176 | 6/2003 |

OTHER PUBLICATIONS

International Search Report issued Jan. 17, 2005 in International Application No. PCT/JP2004/011428.

* cited by examiner

*Primary Examiner* — Chi H. Pham
*Assistant Examiner* — Shick Hom
(74) *Attorney, Agent, or Firm* — Wenderoth, Lind & Ponack, L.L.P.

(57) ABSTRACT

A communication bandwidth is divided into a beacon period in which all master stations compete for transmission of a beacon packet, a first carrier sense multiple access (CSMA) period in which only authorized specific stations are allowed to compete for access, and a second CSMA period in which all stations are allowed to compete for access. The master stations exchange information with each other about a communication bandwidth being used in the first CSMA period, thereby calculating a communication bandwidth which can be used by each communication system in the first CSMA period, based on the information.

4 Claims, 16 Drawing Sheets

F I G. 1
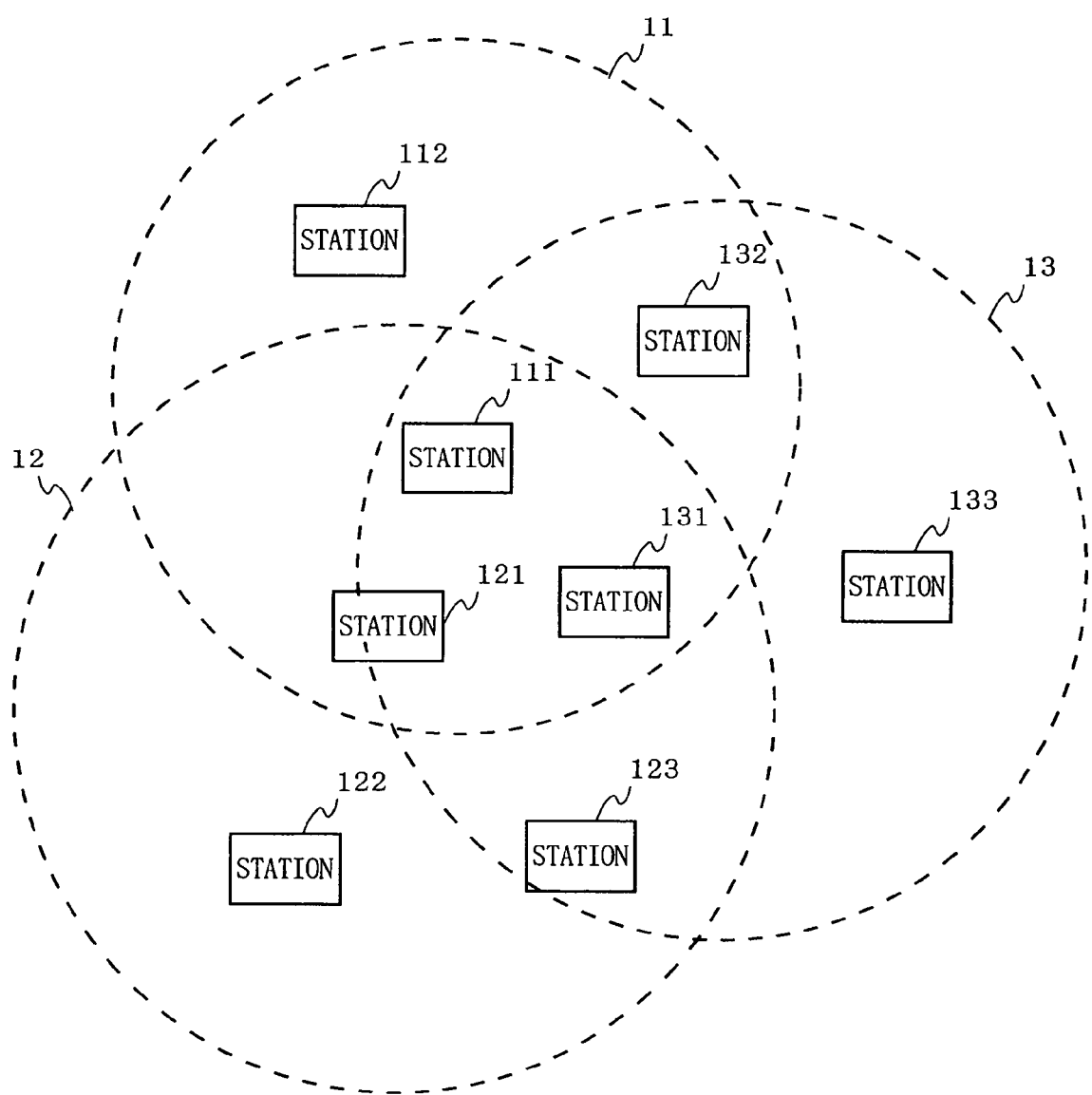

FIG. 11

<Frame Control>

| Field Name | Octet | BitNum | Bits | Definition |
|---|---|---|---|---|
| BSSID | 0 - 5 | 0 - 7 | 48 | BSS Identifier |
| DA | 6 - 11 | 0 - 7 | 48 | Destination Address |
| SA | 12 - 17 | 0 - 7 | 48 | Source Address |
| DT | 18 | 0 - 3 | 4 | Destination Address |
| RSV | 18 | 4 - 7 | 12 | (reserved) |
| | 19 | 0 - 7 | | |
| VF | 20 - 31 | 0 - 7 | 96 | Variant Field |
| FCCS | 32 - 33 | 0 - 7 | 16 | Frame Control Check Sequence |

F I G. 1 2

<VF (for beacon)>

| Field Name | Octet | BitNum | Bits | Definition |
|---|---|---|---|---|
| TS | 0 - 3 | 0 - 7 | 32 | Time Stamp (TSF) |
| OFFSET | 4 - 5 | 0 - 7 | 16 | Beacon Offset |
| RSV1 | 6 - 7 | 0 - 7 | 16 | (reserved) |
| TINF | 8 - 10 | 0 - 7 | 24 | Traffic Information |
| MODE | 11 | 0 - 1 | 2 | Beacon Mode |
| RUNC | 11 | 2 | 1 | Running QoS Controller Change |
| STAT_ACC | 11 | 3 | 1 | Statistics Accumulation Period |
| SEC | 11 | 4 | 1 | Security Mode |
| RSV2 | 11 | 5 - 7 | 3 | (reserved) |

FIG. 13

<Segment Header>

| Field Name | Octet | BitNum | Bits | Definition |
|---|---|---|---|---|
| IV | 0 - 7 | 0 - 7 | 64 | Initialization Vector |
| AT | 8 - 11 | 0 - 7 | 32 | Available Time |
| PBL | 12 - 13 | 0 - 7 | 16 | Payload Block Length (Bytes) |
| SN | 14 - 15 | 0 - 7 | 16 | Sequence Number |
| BN | 16 | 0 - 4 | 5 | Block Number |
| RSC | 16 | 5 | 1 | Receive Sequence Control |
| RSV | 16 | 6 - 7 | 2 | (Reserved) |
| EKS | 17 | 0 - 7 | 8 | Encryption Key Select |
| CBCS | 18 - 19 | 0 - 7 | 16 | Control Block Check Sequence |

FIG. 14

<Data Body (for beacon)>

| Field Name | Octet | BitNum | Bits | Definition |
|---|---|---|---|---|
| VER | 0 | 0 - 6 | 7 | Beacon Version |
| OFDMA | | 7 | 1 | OFDMA Flag |
| PG | 1 | 0 - 7 | 8 | Post Guard |
| BN | 2 - 3 | 0 - 7 | 16 | Beacon Number |
| CEK | 4 | 0 - 7 | 8 | Current EKS |
| IC | 5 | 0 - 7 | 8 | Information Count |
| RSV | 6 - 7 | 0 - 7 | 16 | (reserved) |
| SI #1 | var | 0 - 7 | 64 | Schedule Information #1 |
| ⋮ | | | | |
| SI #n | var | 0 - 7 | 64 | Schedule Information #n |

MASTER STATION OF COMMUNICATION SYSTEM AND ACCESS CONTROL METHOD

This is a Rule 53 (b) Divisional of application Ser. No. 10/912,192, filed Aug. 6, 2004 now U.S. Pat. No. 7,315,524.

BACKGROUND OF THE INVENTION

1. Field of the Invention

The present invention relates to a master station of a communication system and an access control method, and more particularly, relates to an access control method, which is used in a plurality of communication systems sharing the same channel, for preventing interference between the plurality of communication systems from occurring.

2. Description of the Background Art

Conventionally, as a technique for reducing interference between a plurality of communication systems sharing the same channel, there exists an access control method for reducing the influence of interference signals by transmission power control. For example, there exists Japanese Laid-Open Patent Publication No. 2002-198834 (patent document 1), Japanese Laid-Open Patent Publication No. 2003-37556 (patent document 2), or Japanese Laid-Open Patent Publication No. 2001-53745 (patent document 3).

Patent document 1 discloses a method for attenuating a signal power and an interference power by an attenuator provided in a base station, and compensating a power of a wireless signal inputted to a receiver with a transmission power of a transmitter of a terminal station so that a power level of the wireless signal becomes a reference level.

Also, patent document 2 discloses a method by which a base station, which has detected interference signals, notifies interference information to another base station transmitting the interference signals via a local communication network for causing the notified base station to reduce a transmission power based on the interference information.

Further, patent document 3 discloses the following method. Firstly, a frequency resource is allocated to a wireless station from which high priority data is to be transmitted. Also, a timing and a frame length in use for transmission of the high priority data are allocated thereto. When the high priority data is transmitted from an access point (AP) in accordance with the allocated timing and frame length, the wireless station checks channel availability by performing physical carrier sense before transmission, and transmits the high priority data only if channel availability is verified (i.e., the channel is idle).

However, in the case where the above-described communication system is a power line communication system, depending on the configuration of a device connected to a network, an amount of signal attenuation in one communication system may substantially exceed an amount of signal attenuation which interferes with the other communication systems due to the characteristics of a power line transmission path. That is, in the case where patent document 1 or patent document 2 is applied to the power line communication system and interference between the communication systems is performed by power control, there is a possibility that, depending on the device configuration, some devices may be unable to perform device communication in the system due to reduced signal intensity. Also, in the case of wireless communications, the similar phenomenon, that is, signal intensity is suddenly reduced despite the physical closeness, may occur due to attenuation of the signal intensity, which is caused by a shield.

The above-described conventional configuration does not allow one communication system to maintain the quality of communications performed therein by transmission power control while reducing interference with the other communication systems. Thus, throughput of each communication system is substantially reduced due to the interference between the communication systems, and it is difficult to perform communication bandwidth control.

Also, in the case where the control disclosed in patent document 3 is employed, the interference between the communication systems can be reduced by virtual carrier or physical carrier sense. However, it is impossible to assure quality of service (QoS) of a communication bandwidth.

SUMMARY OF THE INVENTION

Therefore, an object of the present invention is to provide a master station and an access control method being capable of easily avoiding interference between communication systems while assuring QoS of a communication bandwidth of each communication system without performing transmission power control in a plurality of communication systems sharing the same channel.

The present invention has the following features to attain the object mentioned above.

The present invention is directed to a master station used in a communication system in a system environment in which a plurality of communication systems, each of which is composed of at least one slave station and the master station managing the slave station, shares the same channel. In order to solve the above problems, the master station of the present invention includes a communication section, an acquisition section, and a determination section.

The communication section divides a communication bandwidth into a beacon period in which all master stations compete for transmission of a beacon packet, a first carrier sense multiple access (CSMA) period in which only authorized specific stations are allowed to compete for access, and a second CSMA period in which all stations are allowed to compete for access, and repeatedly communicates on a periodic basis. The acquisition section acquires a status of use of communication bandwidths in the other communication systems. The determination section calculates a communication bandwidth available in the communication system, to which the master station belongs, in the first CSMA period based on the status of use of the communication bandwidths acquired by the acquisition section, and determines whether communication requested by the slave station is accepted or rejected in accordance with the calculated communication bandwidth.

Typically, the beacon packet includes system information providing at least allocated times of the beacon period, the first CSMA period, and the second CSMA period. The presence or absence of beacon packet transmission by another master station is checked after a random back-off process for each cycle of the beacon period. If the absence is confirmed, the beacon packet is transmitted. On the other hand, if the presence is confirmed, the beacon packet is not transmitted.

Also, the acquisition section may acquire a status of use of communication bandwidths in the other communication systems by information exchange with the other master stations using the second CSMA period, or may acquire a status of use of communication bandwidths in the other communication systems from a beacon packet received from any of the other master stations in the beacon period.

In this case, it is preferable that a total available bandwidth is obtained with respect to a communication bandwidth in the first CSMA period based on CSMA access efficiency and a retransmission bandwidth, and that an access request from the slave station is restricted so that the communication bandwidth to be calculated by the master station does not exceed the total available bandwidth. Also, each of the authorized specific stations preferably performs transmission time management in the first CSMA period so that a transmission bandwidth does not exceed a previously specified requested bandwidth. Further, an allocated time AT in the first CSMA period may be calculated using an expression AT=(ΣTn+M)× α, based on communication bandwidths Tn requested in the communication systems of the other master stations, a communication bandwidth M requested in the communication system to which the master station belongs, and a predetermined coefficient α.

Also, the beacon packet may include system information providing at least a start time of the beacon period and a transmission time of the beacon packet in accordance with a timer value of the master station transmitting the beacon packet. In this case, preferably, a transmission time of the beacon packet is acquired from the received beacon packet, and a timer value thereof is corrected based on the acquired beacon packet transmission time. Especially, it is efficient to calculate an intermediate value between a timer value thereof and the transmission time of the beacon packet of any of the other master stations, thereby correcting the timer value to the intermediate value.

The processes performed by each component of the above-described master station can be considered as an access control method providing a series of procedures. This method is provided in the form of a program causing a computer to execute the series of procedures. This program may be introduced to the computer via a computer-readable recording medium. Also, each component of the above-described master station may be realized as an LSI, which is an integrated circuit.

As described above, based on the present invention, a communication bandwidth is divided into the following three periods: a beacon period, a first CSMA period, and a second CSMA period, and an allocation for the first CSMA period is determined based on information about a currently used communication bandwidth of each communication system. As a result, even if a plurality of communication systems share the same channel, it is possible to easily avoid interference between communication systems and assure QoS of a communication bandwidth of each communication system without performing transmission power control. Also, different access modes do not affect each other.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustration showing an exemplary communication system environment to which the present invention is applied;

FIG. 11 is an illustration showing the details of a frame control section in FIG. 10;

FIG. 12 is an illustration showing the details of a Variant field (VF) in FIG. 11;

FIG. 13 is an illustration showing the details of a segment header section in FIG. 10;

FIG. 14 is an illustration showing the details of a data body section in FIG. 10;

DESCRIPTION OF THE PREFERRED EMBODIMENTS

Figure 2:
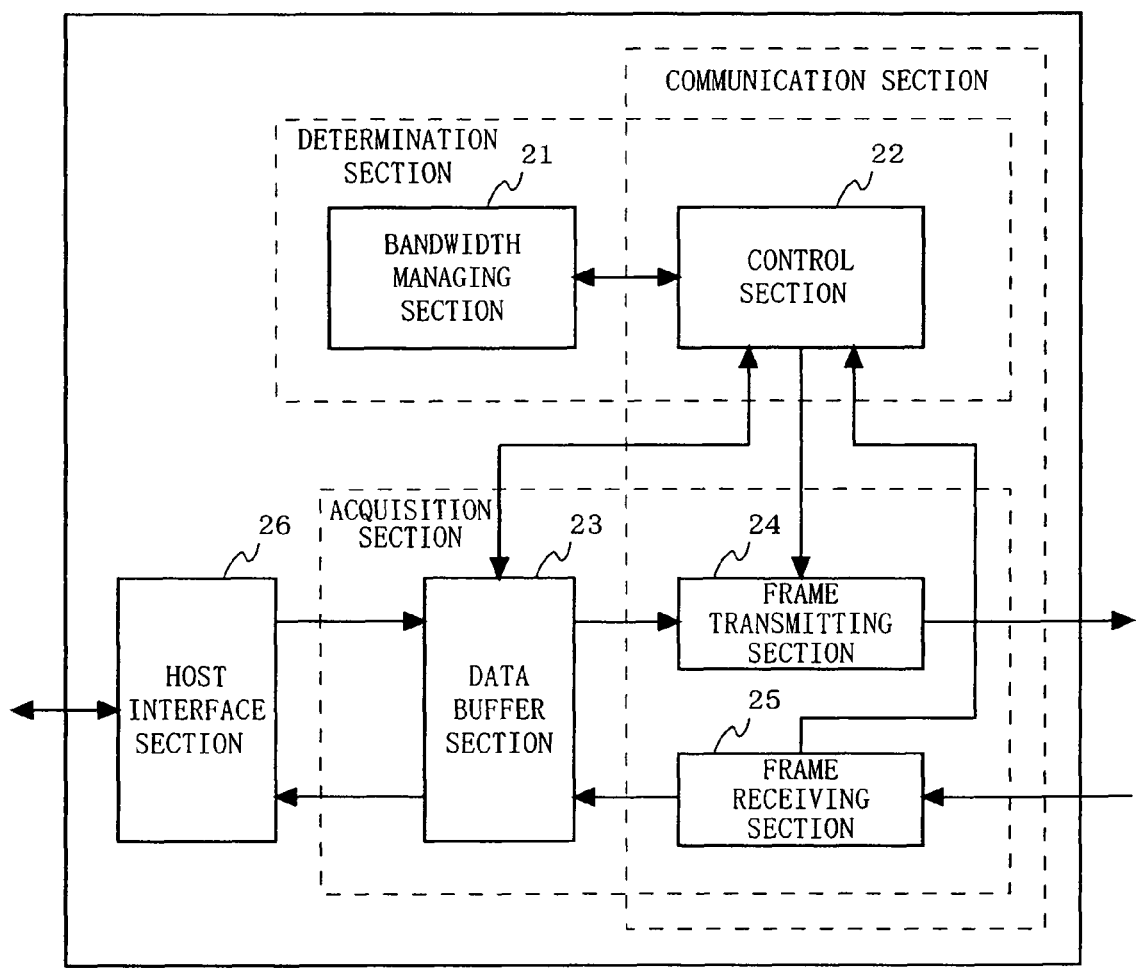
FIG. 2 is a block diagram showing an exemplary detailed structure of a station.

Hereinafter, with reference to the drawings, embodiments of the present invention will be described in detail.

FIG. 1 is an illustration showing an exemplary communication system environment to which the present invention is applied. FIG. 1 shows an exemplary environment including three communication systems 11 to 13 which interfere with each other. The communication system 11 includes a master station 111 and a slave station 112, the communication system 12 includes a mater station 121 and slave stations 122 and 123, and the communication system 13 includes a master station 131 and slave stations 132 and 133.

Each of the master stations and slave stations includes, as shown in FIG. 2, a bandwidth managing section 21, a control section 22, a data buffer section 23, a frame transmitting section 24, a frame receiving section 25, and a host interface section 26. The bandwidth managing section 21 manages various information about a communication bandwidth. The control section 22 controls the entirety of the station. The data buffer section 23 temporarily stores various packets. The frame transmitting section 24 transmits the packet stored in the data buffer section 23. The frame receiving section 25 causes the data buffer section 23 to store a received packet. The host interface section 26 is, for example, an interface with a host or an interface with another medium (e.g., communication system) such as a bridge configuration. The determination section is composed of the bandwidth managing section 21 and the control section 22. Also, the acquisition section is composed of the data buffer section 23, the frame transmitting section 24, and the frame receiving section 25. Further, a communication section is composed of the control section 22, the frame transmitting section 24, and the frame receiving section 25.

Figure 3:
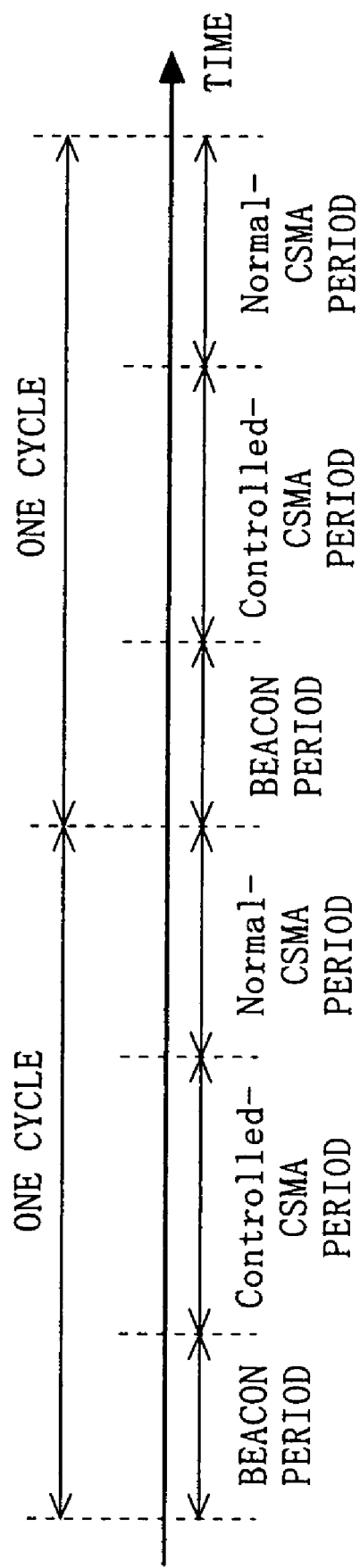
FIG. 3 is an illustration for describing period splitting of a communication bandwidth.

One of the features of the present invention is that a communication bandwidth used by the communication systems 11 to 13 is previously divided into the following three periods: a beacon period, a Controlled-CSMA period, and a Normal-CSMA period, each of which has a defined role. During a beacon period, all master stations compete for transmission of a beacon packet. During a Controlled-CSMA period (first CSMA period), only authorized specific stations are allowed to compete for access. That is, the Controlled-CSMA period is a carrier sense multiple access (CSMA) period to which access restriction is applied. During a Normal-CSMA period (second CSMA period), all stations are allowed to compete for access. That is, the Normal-CSMA period is a CSMA period to which no access restriction is applied. These three periods are periodically repeated (see FIG. 3).

The master stations 111, 121, and 131 manage a beacon period, a Controlled-CSMA period, and a Normal-CSMA period in accordance with a timer provided in each control section 22, for example. Typically, system information indicating an allocated time of each period is transmitted as information stored in a beacon packet.

Hereinafter, an access control method using the above-described master and slave stations will be described below.

First Embodiment

Figure 4:
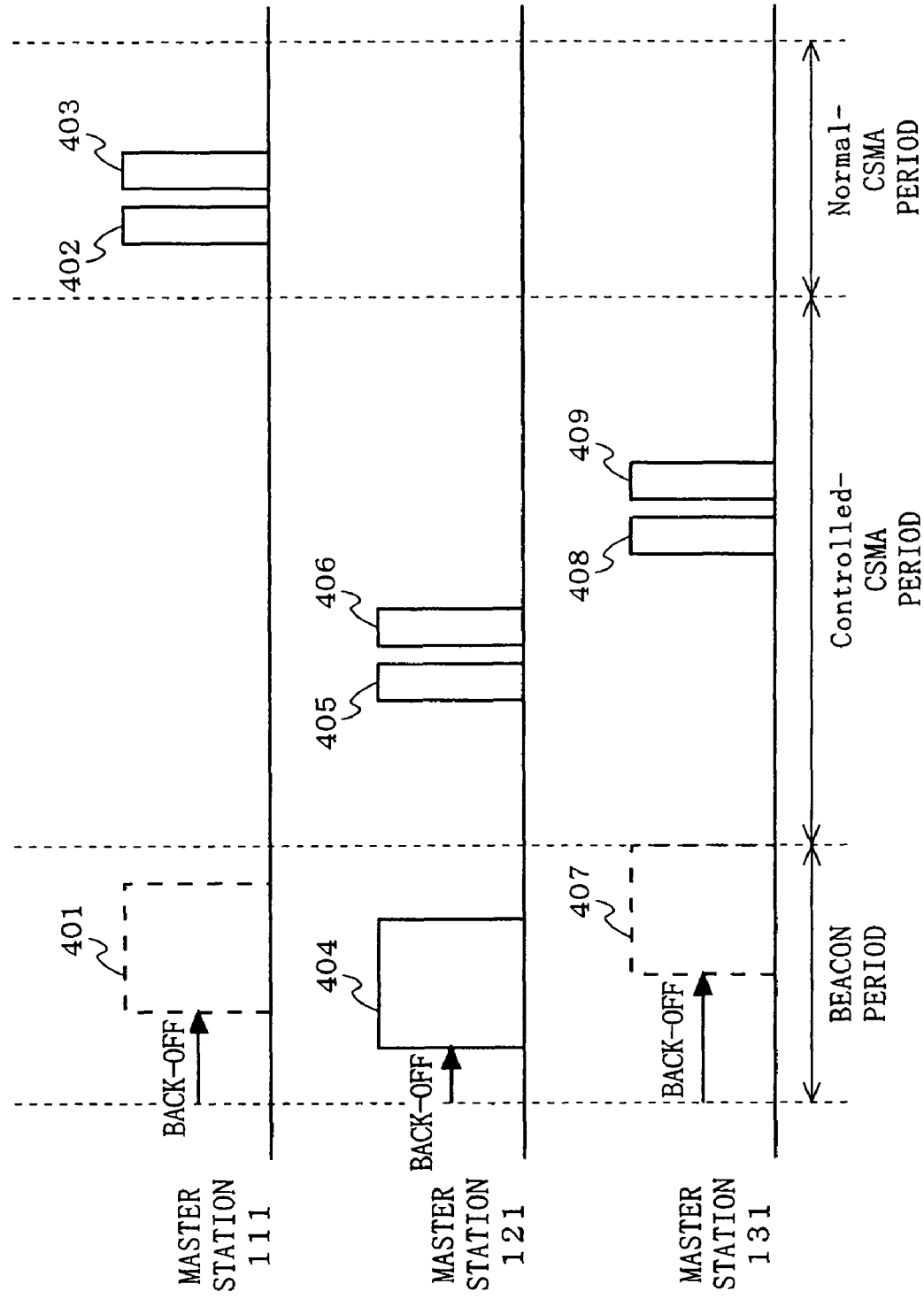
FIG. 4 is a timing chart for describing an access control method according to a first embodiment of the present invention.
Figure 5:
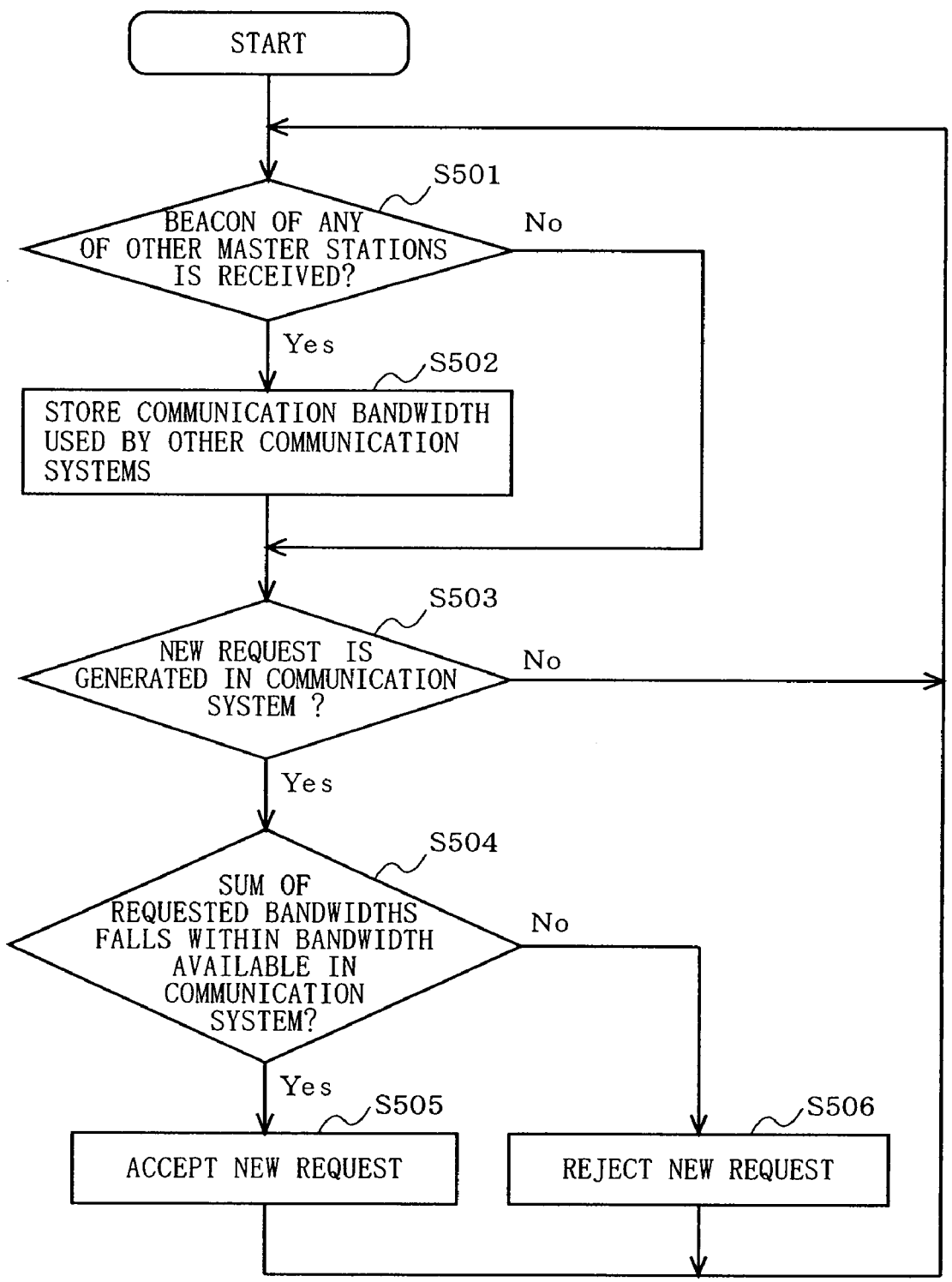
FIG. 5 is a flowchart for describing the access control method according to the first embodiment of the present invention.

FIG. 4 is a timing chart for describing an access control method according to a first embodiment of the present invention. Note that, in the present embodiment, a case in which start times of the beacon periods are the same (i.e., start times of the beacon periods are previously synchronized) will be described. In order to synchronize start and end times of the beacon periods, a method which will be described in a third embodiment may be used, for example. Also, assume that information about a communication bandwidth used by a communication system is transmitted as information stored in a beacon packet. FIG. 5 is a flowchart for describing the access control method (bandwidth managing method) according to the first embodiment of the present invention.

As shown in FIG. 4, each of the control sections 22 included in the respective master stations 111, 121, and 131 performs a random back-off process within a beacon period for transmitting its own beacon at a start time of the beacon period. The control sections 22 of the master stations 111, 121, and 131 perform a random back-off process for transmitting beacon packets 401, 404, and 407, respectively. When the random back-off process is completed, each of the control sections 22 of the master stations 111, 121, and 131 performs carrier sense in order to check (i.e., check a medium) if another beacon packet is being transmitted from any of the other master stations, and transmits its own beacon packet only if another beacon packet is not being transmitted from any of the other master stations. That is, only a master station whose random back-off process is first completed can transmit its own beacon packet.

In the example as shown in FIG. 4, the master station 121, which completes the random back-off process first, generates the beacon packet 404 in the data buffer section 23, and transmits the generated beacon packet 404 using the frame transmitting section 24. This beacon packet includes, as system information, a beacon packet transmission time, a start time of a beacon period, a start time of a Controlled-CSMA period, and a start time of a Normal-CSMA period, etc., based on the timer. Note that the master stations 111 and 131 detecting transmission of the beacon packet 404 by carrier sense stop transmission of the beacon packets 401 and 407, respectively.

When the beacon packet 404 is received from the master station 121 via the frame receiving section 25 (step S501), the master stations 111 and 131 temporarily store the beacon packet 404 in the data buffer section 23. Each of the control sections 22 of the master stations 111 and 131 extracts information about a communication bandwidth used by the communication system 12 from the stored beacon packet, and stores it in the bandwidth managing section 21 (step S502). When the new information is stored in the bandwidth managing section 21, each of the master stations 111 and 131 determines whether or not a new request is generated in each communication system (step S503). In the case where a new request is generated, each of the master stations 111 and 131 newly calculates a communication bandwidth available in its own communication system based on the stored information, and compares it with the sum of the communication bandwidth currently used by its own communication system and a communication bandwidth of the new request (step S504). As a result of the above comparison, if the sum is smaller than the newly calculated communication bandwidth, each of the master stations 111 and 131 accepts the new request (step S505). On the other hand, if the sum is greater than the newly calculated communication bandwidth, the new request is rejected (step S506).

Figure 6:
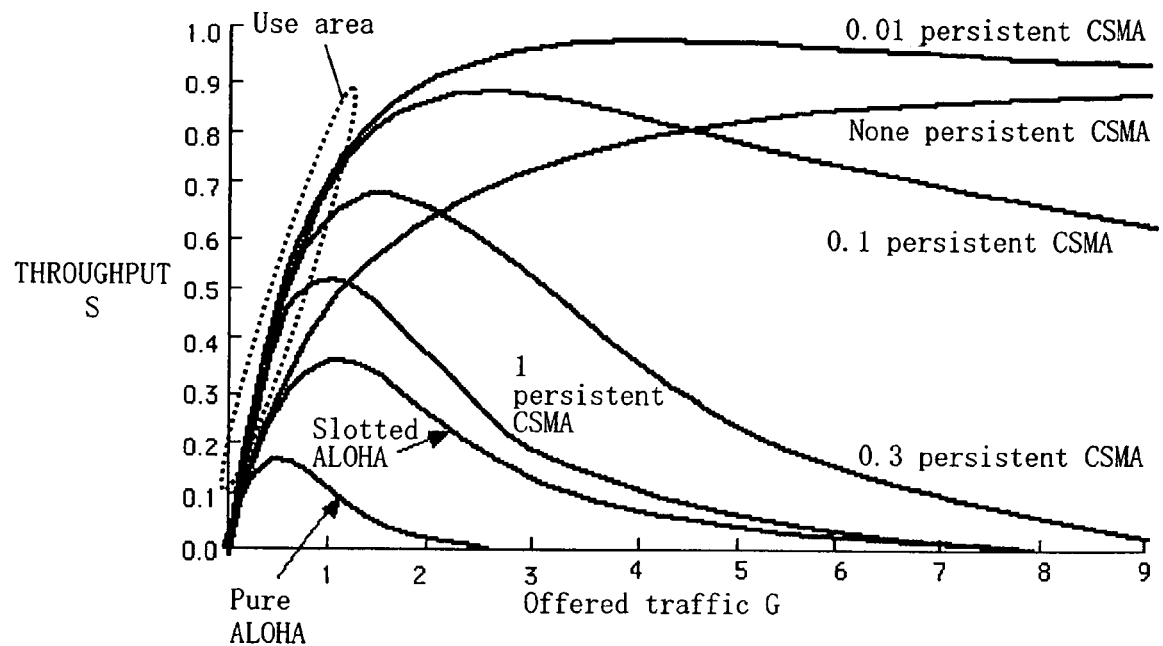
FIG. 6 is an illustration showing the relationship between traffic and throughput in CSMA access.

Here, a method performed at step S504 for calculating a communication bandwidth available in one communication system based on the communication bandwidths used by other communication systems will be described using a specific example. For example, in the case where the maximum bandwidth in the Controlled-CSMA period is 30 Mbps and the sum of the communication bandwidths used by other communication systems is 6 Mbps, the efficiency of CSMA is 0.65 and a percentage of a redundant bandwidth (a margin) for retransmission, for example, is 20% based on the characteristics as shown in FIG. 6. In this case, the total communication bandwidth available in the entirety of the communication systems (total available bandwidth) is 15.6 Mbps (=30× 0.65×0.8). Thus, a communication bandwidth available in one communication system is 9.6 Mbps (=15.6−6.0). As a result, in this example, a new request is accepted if a communication bandwidth thereof is equal to or smaller than 9.6 Mbps.

Figure 7:
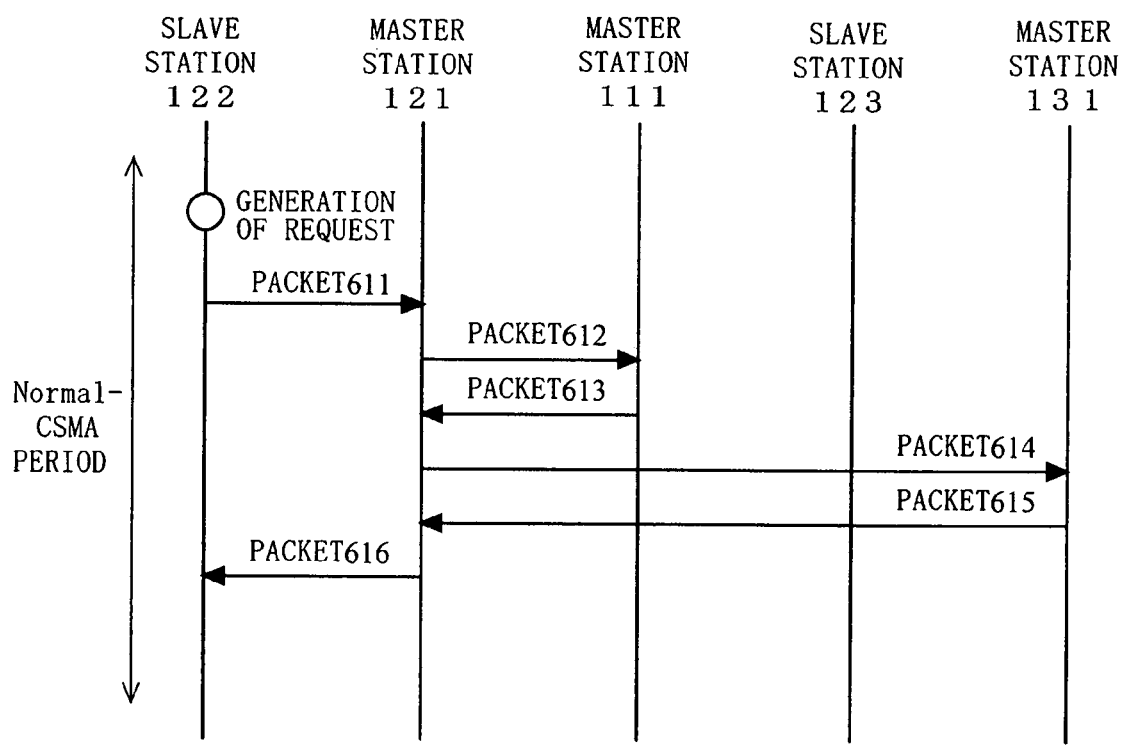
FIG. 7 is a sequence for describing a method utilizing a Normal-CSMA period.
Figure 8:
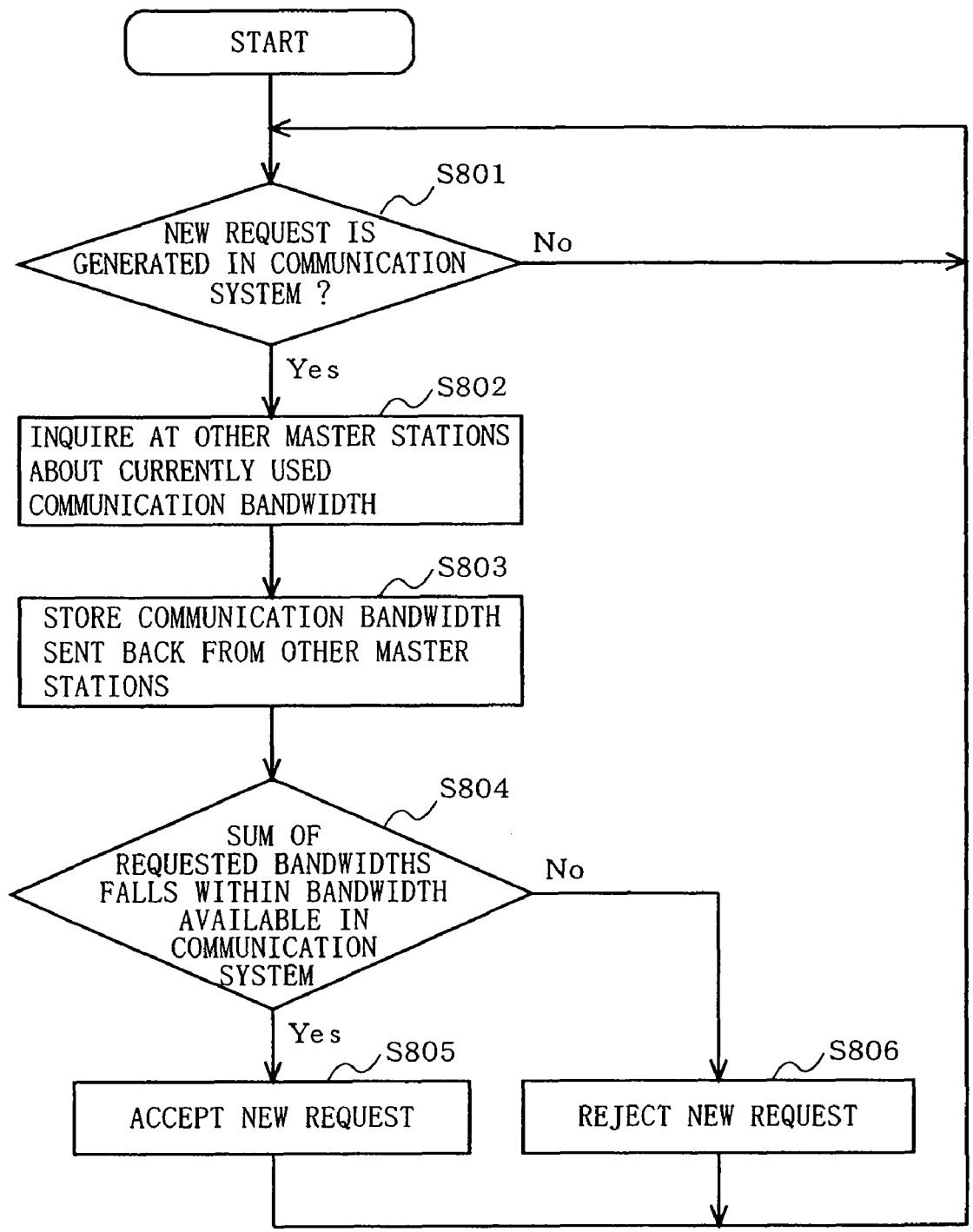
FIG. 8 is a flowchart for describing the method utilizing a Normal-CSMA period.

Other than the above-described method utilizing a beacon period, information about communication bandwidths used by other communication systems may be acquired by a method utilizing a Normal-CSMA period. Such a method will be described using FIGS. 7 and 8.

For example, in the case where the slave station 122 has to assure QoS, the slave station 122 transmits a QoS request packet 611 to the master station 121 included in the same communication system (step S801). The master station 121, which has received the packet 611 via the frame receiving section 25, temporarily stores the received packet 611 in the data buffer section 23. Then, the control section 22 of the master station 121 transmits status request packets 612 and 614 to the master stations 111 and 131, respectively, whose presence in its neighborhood is detected by the beacon packet stored in the data buffer section 23 (step S802). Specifically, the control section 22 of the master station 121 generates the packets 612 and 614 in the data buffer section 23, and transmits the generated packets 612 and 614 to the master stations 111 and 131, respectively, via the frame transmitting section 24.

Each of the frame receiving sections 25 of the master stations 111 and 131, which have received the packets 612 and 614, respectively, stores the received packet in the data buffer section 23. Then, the control sections 22 of the master stations 111 and 131 transmit status reply packets 613 and 615 including the information about the currently-used communication bandwidth stored in the bandwidth managing section 21 to the master station 121, respectively. Specifically, the control sections 22 of the master stations 111 and 131 generate the packets 613 and 615, respectively, in the data buffer section 23, and transmit the generated packets to the master station 121 via the frame transmitting section 24.

When the packets 613 and 615 are received from the master stations 111 and 131, respectively (step S803), the control section 22 of the master station 121 determines whether or not the request from the slave station 122 is acceptable based on the currently-used communication bandwidth information included in the packets, the above-described maximum bandwidth in the Controlled-CSMA period, and the margin (step S804). Then, based on the determination results, the control section 22 of the master station 121 generates a QoS reply packet 616 indicating acceptance or rejection of the request in the data buffer section 23, and transmits it to the slave station 122 via the frame transmitting section 24 (steps S805 and S806).

The control section 22 of the slave station 122, which has received the packet 616 indicating acceptance of the request, transmits a data packet by a typical CSMA process during a Controlled-CSMA period. That is, a transmitting station transmits a data packet after carrier sense, and a receiving station, which has received the data packet, sends back an acknowledgement packet. In the case where the transmitting station cannot receive the acknowledgement packet due to a collision or an error, etc., a random back-off process is performed and a data packet is retransmitted. Specifically, when data such as an IP (Internet Protocol) packet is stored in the data buffer section 23 via the host interface section 26, the control section 22 of the slave station 122 determines whether or not the stored data is QoS data. In the case where the stored data is QoS data, the control section 22 of the slave station 122 verifies that there is no other data frame, etc., by carrier sense after performing a random back-off process during a Controlled-CSMA period, and transmits a data frame using the frame transmitting section 24. Note that, in the case where the stored data is not QoS data, the control section 22 of the slave station 122 performs a similar process during a Normal-CSMA period, and transmits a data frame.

Figure 9:
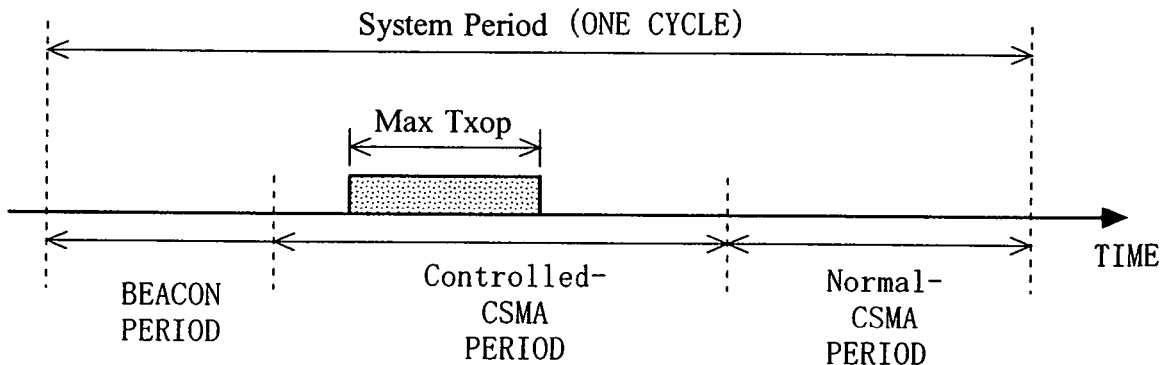
FIG. 9 is an illustration showing a TXOP in a Controlled-CSMA period.
Figure 10:
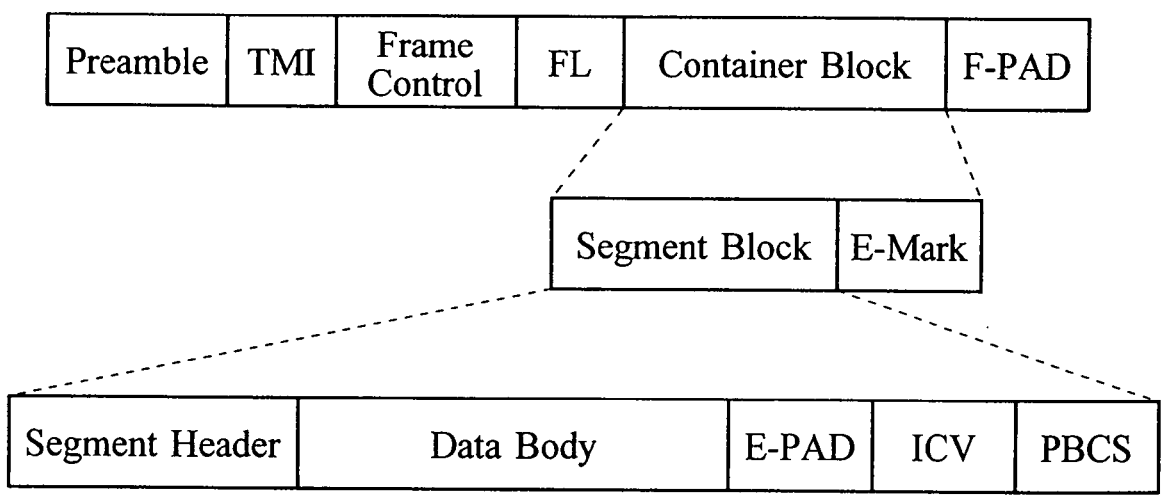
FIG. 10 is an illustration showing a format of a beacon packet (beacon frame) used for power line communications for storing allocation information and announcing the information to the system.

Even if the control section 22 of the slave station 122 has many pieces of transmission data, the control section 22 restricts the maximum amount of data transmission in the Controlled-CSMA period. For example, in the case where a rate is calculated in system periods, the maximum data transmission amount is restricted up to 20% greater than the requested bandwidth. Also, as shown in FIG. 9, a restriction is imposed by setting the maximum transmission opportunity (TXOP), for example. In the case where a TXOP is set as shown in FIG. 9, the control section 22 sequentially transmits a data packet. In this case, control is performed so that the minimum packet interval is maintained and other stations cannot perform transmission unless an interval longer than the minimum packet interval is detected.

Note that the control section 22 may include a typical RTS (Request To Send) or CTS (Clear To Send) process before transmitting a data packet, whereby it is possible to solve a hidden terminal problem. Also, virtual carrier duration information, etc., may be included in a packet in order to perform virtual carrier sense, thereby reducing collision frequency. Also, a master station may transmit a polling packet during a Controlled-CSMA period to set a TXOP, whereby a slave station transmits a data packet in response to the polling. It will be understood that a RTS/CTS sequence may be included. In the case where a data packet, an acknowledgement packet, or a RTS packet is not sent back in response to the polling, retransmission of a polling packet or polling to a next station may be performed.

Second Embodiment

In a second embodiment, with reference to FIGS. 10 to 14, a specific example of a case in which the access control method described in the first embodiment is applied to a power line communication system will be described. FIGS. 10 to 14 are illustrations showing a format of a beacon packet (beacon frame) used for power line communications for storing allocation information and announcing the information to the system.

Assume that TINF information included in VF (Variant Field) in frame control stores information about communication bandwidths T1 to Tn, which are necessary for assuring QoS and accepted by a plurality of master stations 1 to n (n is an arbitrary integer), respectively. Also, as shown in FIG. 14, schedule information SI included in a data body section of a beacon packet stores information about an allocated time of a beacon period, an allocated time AT of a Controlled-CSMA period, and an allocated time of a Normal-CSMA period. In the present embodiment, assume that a beacon cycle is 50 ms.

The master station 111 receives a beacon packet from other master stations 121 and 131, and stores the received packet in the data buffer section 23. The master station 111 analyzes the beacon packet stored in the data buffer section 23, extracts TINF information, and stores a set of an address of the master station 121 or 131 and the TINF information in the bandwidth managing section 21. In the case where there already exists the TINF information, update of the information is performed. In the present embodiment, assume that the TINF information of the master station 121 is 5 ms, and the TINF information of the master station 131 is 8 ms. Note that the TINF information is not updated in the case where a beacon packet is undetectable due to a collision or an error, etc. Thus, the control section 22 uses the previously received TINF information. In this case, it is preferable to set a time period during which the data is valid.

The master station 111 generates a beacon packet in which a communication bandwidth M requested by its communication system is set. Like in this example, in the case where a communication bandwidth request from the slave station 112 belonging to the same communication system is not accepted, the communication bandwidth M is 0 ms. Thus, the master station 111 generates a beacon packet in which a communication bandwidth M is set to "0". The master station 111 determines an allocated time AT of a Controlled-CSMA period using the TINF information of the master stations 121 and 131 and its own communication bandwidth information. For example, in the case where a predetermined coefficient α is 1.3, the allocated time AT of a Controlled-CSMA period is calculated as follows: $(\Sigma Tn+M) \times \alpha = (5+8+0) \times 1.3 = 16.9$ ms, and is set as schedule information SI.

Similarly, each of the master stations 121 and 131 determines an allocated time AT of a Controlled-CSMA period using the TINF information acquired from other master stations, stores it in the schedule information SI, and generates a beacon. Note that the above-described α coefficient and expression are illustrative only, and other expression may be used in the case where the RTS/CTS sequence or polling is used, for example.

Next, a sequence in the case where a bandwidth request is sent from the slave station 112 to the master station 111 will be described.

Before sending a communication bandwidth request, the control section 22 of the slave station 112 sends a test pattern to a communication destination station to check the channel conditions therebetween, thereby determining a transmission rate. Specifically, a test pattern is set in the data buffer section 23, and a channel checking frame is transmitted using the frame transmitting section 24. When the channel checking frame is received, the frame receiving section 25 of the destination station determines an optimum modulation scheme and an optimum transmission rate for the channel based on SNR (Signal to Noise Ratio), etc. The control section 22 of the communication destination station generates a channel checking result frame based on the above determination results in the data buffer section 23, and transmits it to the slave station 112. When the channel checking result frame is received, the slave station 112 analyzes the frame, and acquires the modulation scheme and the transmission rate necessary for the communication.

Assume that the transmission rate is 48 Mbps, for example. In this case, if the slave station 112 has to assure a bandwidth of 6 Mbps, the control section 22 of the slave station 112 generates a bandwidth request frame including a transmission rate and a requested bandwidth, and transmits it to the master station 111. In the case where the transmission rate is smaller than the requested bandwidth, the bandwidth request frame is not transmitted since allocation is impossible. In this example, a 6 Mbps bandwidth is requested in the transmission rate 48 Mbps. Thus, the bandwidth is assured if 6.25 ms is allocated to each beacon cycle 50 ms. Note that this calculation may be performed by the control section 22 of the master station 111, or may be performed by the control section 22 of the slave station 112 and is notified to the master station 111.

When the bandwidth request frame is received, the master station 111 stores it in the data buffer section 23. The control section 22 of the master station 111 re-calculates an allocated time AT of a Controlled-CSMA period using data in the bandwidth request frame, and obtains AT=25.025 (=1.3×(5+8+6.25). Assume that the upper limit of a Controlled-CSMA period is 40 ms. In this case, it is determined that the request is acceptable since the allocated time AT obtained by the above calculation is smaller than 40 ms. Thus, the control section 22 of the master station 111 generates a request acceptance completion frame, and transmits it to the slave station 112. In the case where the request is rejected, the control section 22 of the master station 111 transmits a request rejection frame in a similar manner.

Also, in the case where the request is accepted, the control section 22 of the master station 111 updates data in the bandwidth managing section 21, sets the TINF information to 6.25 ms, generates a beacon packet in which the schedule information SI is updated to 25.025 ms, and transmits it periodically. When the beacon packet is received, the slave station 112 analyzes data of the packet. The slave station 112 acquires the schedule information SI and detects a Controlled-CSMA period, thereby transmitting a data frame requiring bandwidth assurance by using a CSMA process during a period of 25.025 ms stored in the schedule information SI. Note that a data frame requiring no bandwidth assurance is transmitted during a Normal-CSMA period.

Third Embodiment

Figure 15:
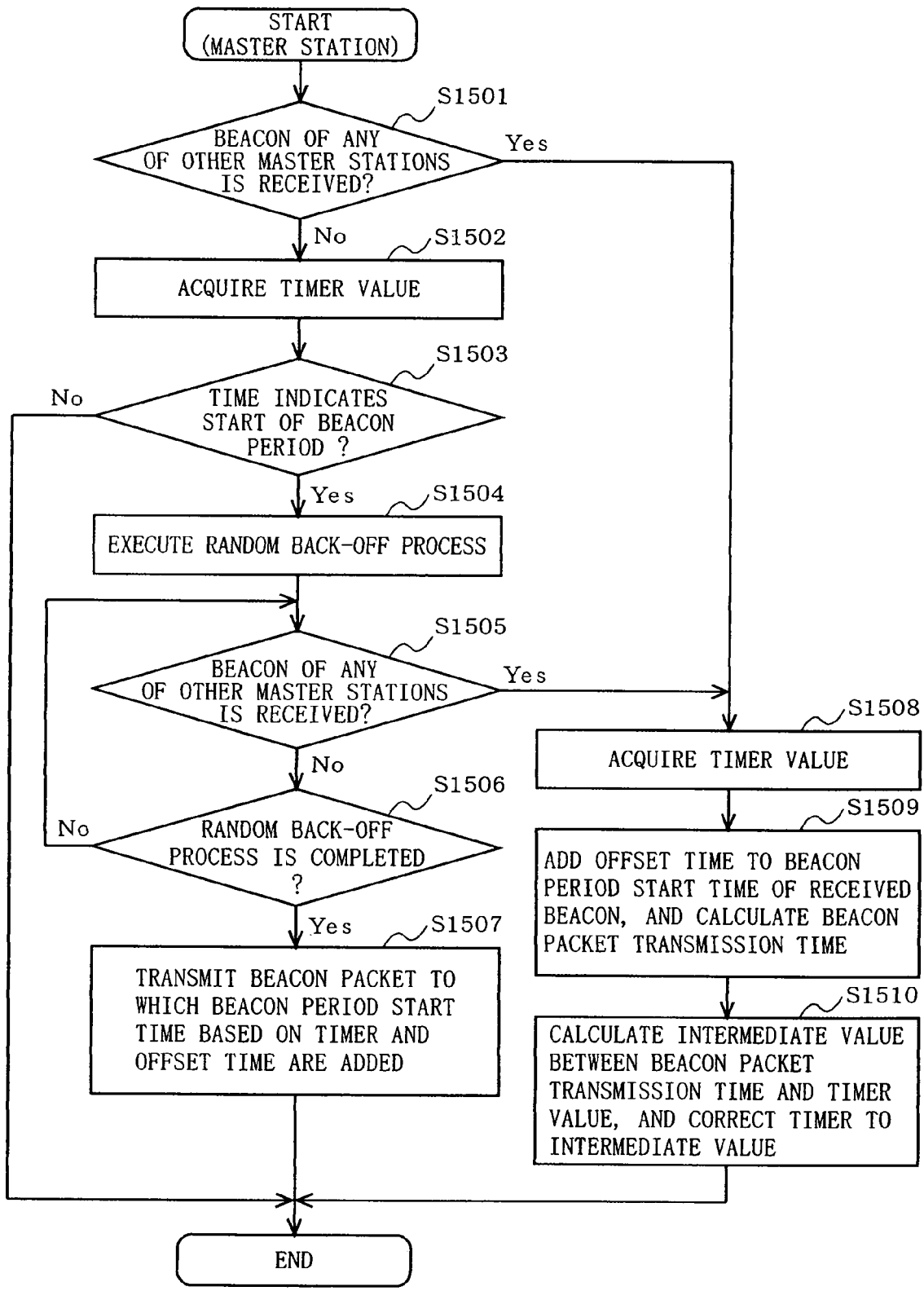
FIG. 15 is a flowchart showing a procedure of an access control method according to a third embodiment of the present invention (master station side)
Figure 16:
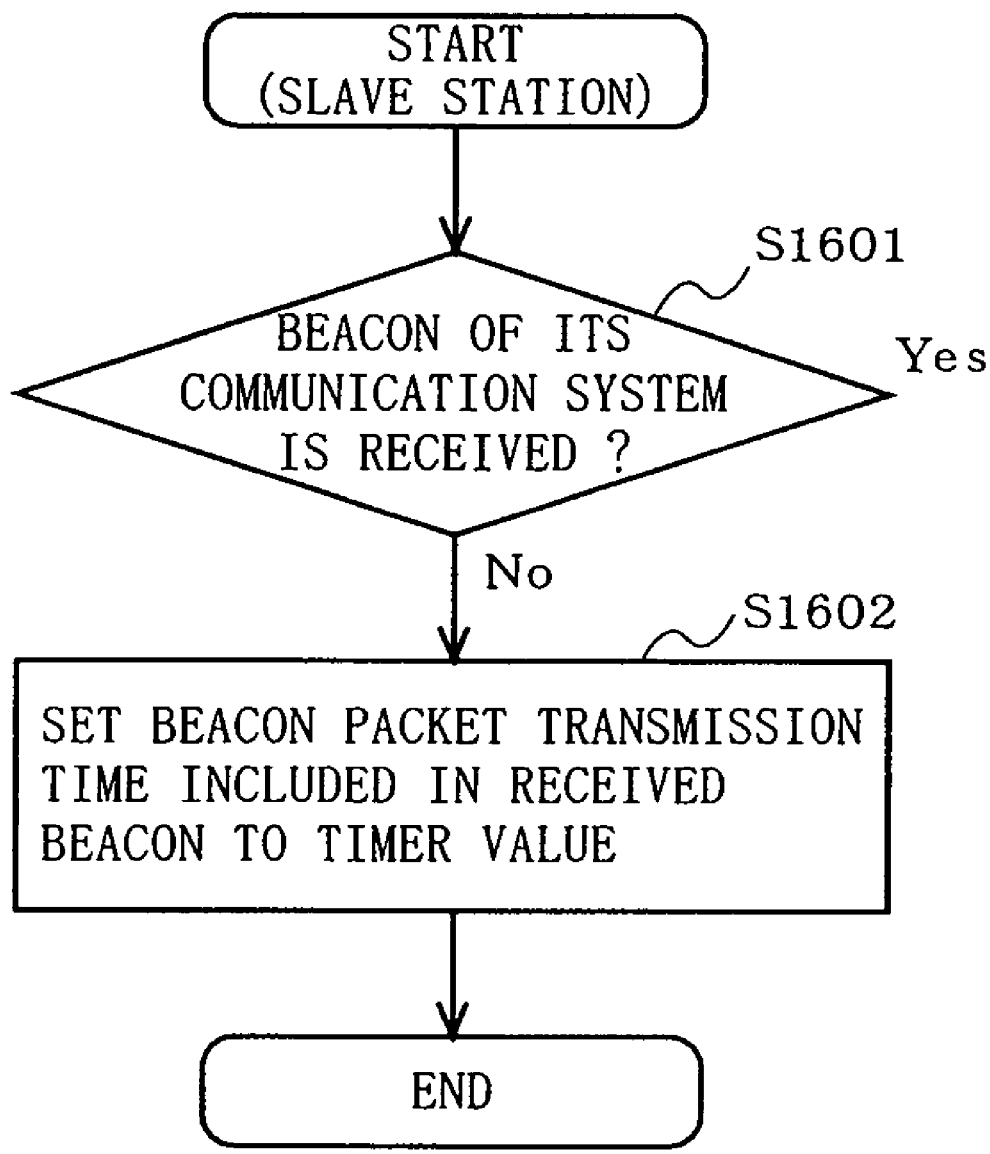
FIG. 16 is a flowchart showing a procedure of an access control method according to the third embodiment of the present invention (slave station side)

In a third embodiment, a process for synchronizing start and end times of the beacon periods, the process being usable in combination with the access control method described in the first embodiment, will be described. FIG. 15 is a flowchart showing a procedure of an access control method according to the third embodiment of the present invention (master station side). FIG. 16 is a flowchart showing a procedure of an access control method according to the third embodiment of the present invention (slave station side).

Each master station individually determines whether or not a beacon packet is newly received (step S1501). In the case where the beacon packet is not received, the master station acquires a value of its own timer (step S1502). The master station determines whether or not the acquired timer value reaches a start time of a beacon period (step S1503). If a start time is not reached, a process is returned to step S1501. If a start time is reached, the master station starts a random back-off process (step S1504).

Figure 17:
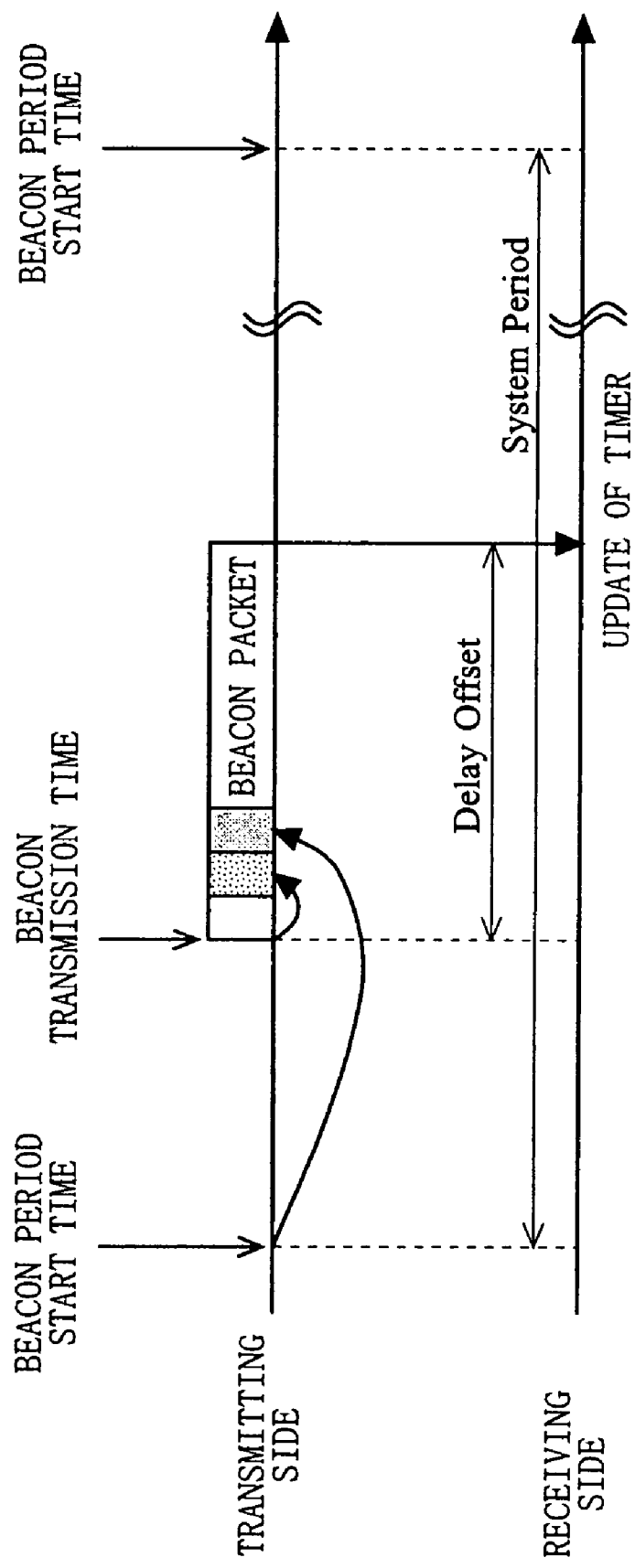
FIG. 17 is an illustration showing information and a timing of a beacon packet in a beacon period.

In the case where a beacon packet is received from another master station in the course of the random back-off process (step S1505, YES), the master station acquires a value of its own timer (step S1508). Next, the master station extracts a beacon period start time from the received beacon packet, and adds a predetermined offset time (DelayOffset) to this beacon period start time, thereby obtaining a beacon packet transmission time in another master station (step S1509). See FIG. 17. Then, the master station calculates an intermediate value between the obtained beacon packet transmission time and its own timer value, and sets the timer to the intermediate value (step S1510). For example, in the case where a value of a beacon packet transmission time in another master station is "1200 counts" and its own timer value is "1300 counts", a value of the timer is set to "1250 counts", which is an intermediate value therebetween.

On the other hand, in the case where the random back-off process is completed without receiving a beacon packet from any of the other master stations (step S1506, YES), the master station generates a beacon packet to which a beacon period start time based on its own timer and a predetermined offset time are added, and transmits it to the other master stations (step S1507).

Each master station acquires a start time of a beacon period, a start time of a Controlled-CSMA period, and a start time of a Normal-CSMA period, which are included in a beacon packet, and detects a timing. Note that a start time of a next beacon period is acquired by adding a SystemPeriod, which is a generation cycle of a beacon period, to a start time of the beacon period.

When each slave station receives a beacon packet from a master station of a communication system to which it belongs (step S1601), the slave station extracts a beacon packet transmission time from the received beacon packet (step S1602). Then, each slave station sets a timer value to the extracted beacon packet transmission time (step S1603).

As such, based on the access control method according to the present invention, a communication bandwidth is divided into the following three periods: a beacon period, a Controlled-CSMA period, and a Normal-CSMA period, and an allocation for the Controlled-CSMA period is determined based on information about a currently-used communication bandwidth of each communication system. As a result, even if a plurality of communication systems share the same channel, it is possible to easily avoid interference between communication systems and assure QoS of a communication bandwidth of each communication system without performing transmission power control. Also, different access modes do not affect each other.

Also, a timer of each station is corrected based on a beacon packet transmission time, whereby it is possible to synchronize the systems with ease. Especially, a system time of each station is corrected by obtaining an intermediate value between a beacon packet transmission time of any of the other stations and its own timer value. Thus, even if there may be a station whose timer is way out of sync, it is possible to synchronize the systems by repeatedly performing a process.

Note that each of the above-described embodiments is realized by a CPU performing interpretation execution for predetermined program data, which is stored in a storage device (a ROM, a RAM, and a hard disk, etc.) and is executable of the above-described procedure. In this case, the program data may be introduced to the storage device via a recording medium, or may be executed directly from the recording medium. Note that the recording medium includes a ROM, a RAM, a semiconductor memory such as a flash memory, a magnetic disk memory such as a flexible disk and a hard disk, an optical disk such as a CD-ROM, a DVD, and a BD, a memory card, or the like. Also, the recording medium is a concept including a communication medium such as a telephone line and a carrier line.

Also, the entirety or a portion of the functional blocks composing the master station of the present invention is realized as an LSI (referred to as an IC, a system LSI, a super LSI, or an ultra LSI, etc., depending on a degree of integration), which is typically an integrated circuit. Each functional block may be separately constructed in chip form, or may be constructed in chip form so that a portion or the entire portion thereof is included.

Also, a method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using the above new integration technology. For example, biotechnology may be applied to the above-described integration.

Figure 18:
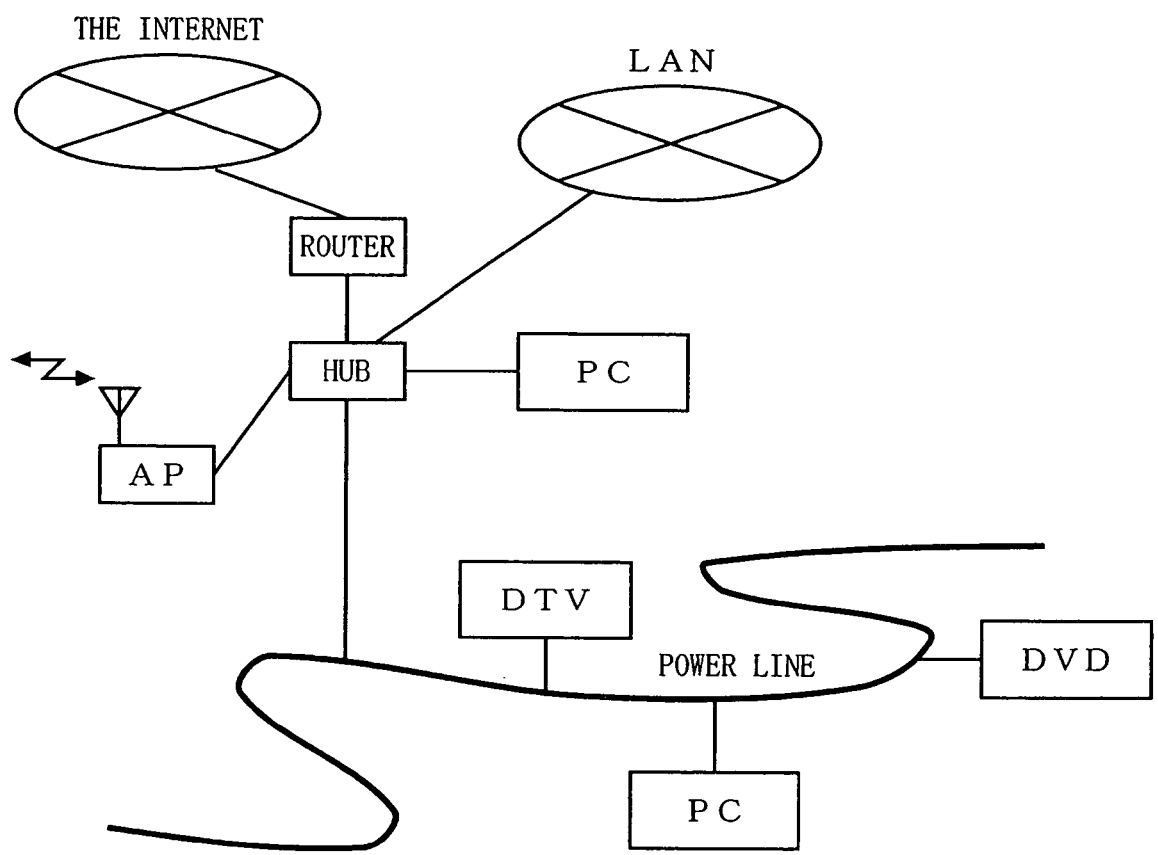
FIG. 18 is an illustration showing an exemplary network system in which the access control method of the present invention is applied to a high-speed power line transmission.

Hereinafter, an example in which the invention described in the above-described embodiments is applied to an actual network system will be described. FIG. 18 is an illustration showing an exemplary network system in which the present invention is applied to a high-speed power line transmission. In FIG. 18, a power line is connected to an IEEE1394 interface and a USB interface, etc., provided in a multimedia device such as a personal computer, a DVD recorder, a digital television, and a home server system via a module having a function of the present invention. As a result, it is possible to configure a network system being capable of transmit digital data such as multimedia data at high speed via a power line. This system increases user-friendliness due to reduced cost and easy installability since it is possible to use a power line, which has already been installed in a home and an office, etc., as a network line without the need for installation of a network cable required in a conventional cable LAN.

In the above-described configuration, an example in which an existing device is applied to a power line communication via an adapter converting a signal interface of the existing multimedia device to an interface of the power line communication has been described. However, it will become possible to perform data transmission between devices via a power cord of a multimedia device by realizing a multimedia device having a built-in function of the present invention. As shown in FIG. 18, it eliminates the need for the adapter, the IEEE1394 cable, and the USB cable, whereby wiring becomes simplified. Also, it is possible to connect to the Internet via a router and connect to a wireless/cable LAN using a hub, etc., whereby a LAN system using the high-speed power line transmission system of the present invention can be extended. Also, by a power line transmission method, transmission data flows via a power line, whereby it is possible to eliminate leakage and interception of data, which become a problem of a wireless LAN. Thus, the power line transmission method is effective in protecting data due to improved security. It will be understood that data transmitted over a power line is protected by an IPSec, which is an extended IP protocol, encryption of contents, other DRM scheme, and the like.

As such, it is possible to perform a high-quality power line transmission of AV contents by realizing a copyright protection function by the encryption of contents and a QoS function including an effect of the present invention (improved throughput and bandwidth allocation responding flexibly to increased retransmission and traffic fluctuations).

While the invention has been described in detail, the foregoing description is in all aspects illustrative and not restrictive. It is understood that numerous other modifications and variations can be devised without departing from the scope of the invention.

What is claimed is:

1. A master station which manages a communication system, the master station comprising:
   a receiver to receive a beacon packet from another master station which manages another communication system which shares a same channel with the communication system, the other master station periodically setting a beacon period in the other communication system to the channel, the beacon packet being transmitted from the other master station during the beacon period, a start time of transmission of the beacon packet being different from a start time of the beacon period, the beacon packet including information indicating an offset which is a period from the start time of the beacon period to the start time of the transmission of the beacon packet; and
   a bandwidth manager to synchronize a beacon period in the communication system with the beacon period in the other communication system on the basis of the information indicating the offset, a beacon packet being transmitted from the master station during the beacon period in the communication system.

2. The master station according to claim 1, wherein the bandwidth manager synchronizes the communication system with the other communication system by repeating a process of:
   obtaining a beacon packet transmission time, which is a timer value of the other master station, at a time point when the other master station starts the transmission of the beacon packet on the basis of the information indicating the offset;
   obtaining a timer value of the master station at a time point when the master station receives the beacon packet from the other master station; and
   correcting the timer value of the master station to an intermediate value between the beacon packet transmission time and the timer value of the master station.

3. A method performed by a master station which manages a communication system, the method comprising the steps of:
   receiving a beacon packet from another master station which manages another communication system which shares a same channel with the communication system, the other master station periodically setting a beacon period in the other communication system to the channel, the beacon packet being transmitted from the other master station during the beacon period, a start time of transmission of the beacon packet being different from a start time of the beacon period, the beacon packet including information indicating an offset which is a period from the start time of the beacon period to the start time of the transmission of the beacon packet; and
synchronizing a beacon period in the communication system with the beacon period in the other communication system on the basis of the information indicating the offset, a beacon packet being transmitted from the master station during the beacon period in the communication system.

4. The method according to claim 3, wherein, at the synchronizing step, the communication system is synchronized with the other communication system by repeating a process of:

obtaining a beacon packet transmission time, which is a timer value of the other master station, at a time point when the other master station starts the transmission of the beacon packet on the basis of the information indicating the offset; obtaining a timer value of the master station at a time point when the master station receives the beacon packet from the other master station; and
correcting the timer value of the master station to an intermediate value between the beacon packet transmission time and the timer value of the master station.

* * * * *